United States Patent
Hada et al.

(10) Patent No.: US 9,963,068 B2
(45) Date of Patent: May 8, 2018

(54) VEHICLE PROXIMITY CONDITION DETECTION AND HAPTIC NOTIFICATION SYSTEM

(71) Applicant: Toyota Motor Engineering & Manufacturing North America, Inc., Erlanger, KY (US)

(72) Inventors: Hideki Hada, Ann Arbor, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days. days.

(21) Appl. No.: 14/997,876

(22) Filed: Jan. 18, 2016

(65) Prior Publication Data

US 2017/0203690 A1    Jul. 20, 2017

(51) Int. Cl.
*B60N 2/02* (2006.01)
*B60Q 9/00* (2006.01)
(Continued)

(52) U.S. Cl.
CPC .......... *B60Q 9/008* (2013.01); *B60G 17/019* (2013.01); *B60N 2/0244* (2013.01); *B60N 2/44* (2013.01);
(Continued)

(58) Field of Classification Search
CPC .......................... B60Q 9/008; B60G 17/0019
See application file for complete search history.

(56) References Cited

U.S. PATENT DOCUMENTS 7,245,231 B2   7/2007   Kiefer et al.
2003/0229447 A1* 12/2003 Wheatley ............. B62D 15/029
                                                        701/300
(Continued)

FOREIGN PATENT DOCUMENTS

DE          10249354  A1    5/2004
DE       102008016017 A1    10/2009
(Continued)

OTHER PUBLICATIONS

NPL—Snowplow Lane Awareness System, McGehee and Raby. Published on Jul. 2002. Accessed on May 3, 2017 at http://www.dot.state.mn.us/guidestar/2001_2005/ivi_hwy_19/final_report.pdf.
*
(Continued)

*Primary Examiner* — Truc M Do
*Assistant Examiner* — Jess Whittington
(74) *Attorney, Agent, or Firm* — Christopher G. Darrow; Darrow Mustafa PC (57)  ABSTRACT

A computing device for a vehicle proximity condition detection and haptic notification system is provided. The computing device includes one or more processors for controlling operation of the computing device, and a memory for storing data and program instructions usable by the one or more processors, wherein the one or more processors are configured to execute instructions stored in the memory to operate, upon detection of a vehicle proximity condition, at least one portion of the vehicle as a haptic device in a user-selected manner directed to informing a vehicle occupant of the vehicle proximity condition, and directed to suggesting to the occupant a vehicle control command that is responsive to the proximity condition.

14 Claims, 5 Drawing Sheets

- Activate feature only when turn signal activated
- Vehicle response if lane change is OK (select one or more of 1, 2 and 3)
  1) generate pulse (select at least one of (a) and (b))
     a) in seat back
     b) in seat bottom
  2) tilt seat (select one of (a) or (b)):
     a) toward target lane
     b) away from target lane
  3) tilt your vehicle (select one of (a) or (b)):
     a) toward target lane
     b) away from target lane
  (return to previous menu)

(51) Int. Cl.
*B60G 17/019* (2006.01)
*B60N 2/44* (2006.01)

(52) U.S. Cl.
CPC ........ *B60N 2/90* (2018.02); *B60N 2002/4485* (2013.01); *B60N 2002/981* (2018.02)

(56) References Cited

U.S. PATENT DOCUMENTS

| | | | |
|---|---|---|---|
| 2004/0049323 A1* | 3/2004 | Tijerina | B60N 2/002 701/1 |
| 2005/0258977 A1* | 11/2005 | Kiefer | G08G 1/16 340/903 |
| 2005/0288837 A1* | 12/2005 | Wiegand | B60R 16/037 701/36 |
| 2006/0076741 A1* | 4/2006 | Lim | B60G 15/067 280/5.508 |
| 2006/0190147 A1 | 8/2006 | Lee et al. | |
| 2007/0028798 A1* | 2/2007 | Langenbeck | B60F 1/02 105/72.2 |
| 2007/0244641 A1* | 10/2007 | Altan | B60Q 9/008 701/300 |
| 2010/0198458 A1* | 8/2010 | Buttolo | G01C 21/3652 701/36 |
| 2010/0253594 A1* | 10/2010 | Szczerba | G01S 13/723 345/7 |
| 2012/0221228 A1* | 8/2012 | Noumura | B60W 30/02 701/110 |
| 2012/0259515 A1* | 10/2012 | Freienstein | B60R 21/0132 701/46 |
| 2013/0006478 A1* | 1/2013 | Lin | B60N 2/10 701/49 |
| 2013/0030650 A1* | 1/2013 | Norris | B60G 17/018 701/40 |
| 2013/0316826 A1* | 11/2013 | Levanon | A63F 13/08 463/36 |
| 2016/0082971 A1* | 3/2016 | Fuehrer | B60W 10/20 701/48 |
| 2016/0304004 A1* | 10/2016 | Sandbothe | A47D 13/00 |
| 2016/0318442 A1* | 11/2016 | James | B60Q 9/00 |
| 2016/0347329 A1* | 12/2016 | Zelman | B60W 50/16 |
| 2017/0113683 A1* | 4/2017 | Mudalige | B60W 30/08 |

FOREIGN PATENT DOCUMENTS

| | | |
|---|---|---|
| DE | 102011001993 A1 | 10/2012 |
| EP | 1413500 B1 | 4/2004 |

OTHER PUBLICATIONS

NPL—McGehee—Snowplow Lane Awareness System Jul. 2002.*

* cited by examiner

VEHICLE PROXIMITY CONDITION DETECTION AND HAPTIC NOTIFICATION SYSTEM

TECHNICAL FIELD

Aspects of the disclosure generally relate to the use of haptic feedback to alert vehicle occupants of various traffic conditions. This information may be useful for improving human-vehicle interaction.

BACKGROUND

Haptic feedback may be useful help promote driver awareness of the driving environment, thereby helping to maximize safe vehicle operation. However, the meanings of some types of haptic feedback may not be intuitive or readily apparent to a given driver. In addition, the vehicle user may have no options regarding what haptic feedback is used in a given vehicle to convey a given vehicle or traffic condition. It would be beneficial to have a vehicle control system providing user-selectable options for using haptic feedback to quickly alert vehicle occupants to various conditions relating to the proximity of other vehicles. It would also be beneficial to have a vehicle control system providing user-selectable options for prompting or urging the driver to react appropriately to a given vehicle proximity condition.

SUMMARY

In one aspect of the embodiments described herein, a computing device for a vehicle proximity condition detection and haptic notification system is provided. The computing device includes one or more processors for controlling operation of the computing device, and a memory for storing data and program instructions usable by the one or more processors, wherein the one or more processors are configured to execute instructions stored in the memory to operate, upon detection of a vehicle proximity condition, at least one portion of the vehicle as a haptic device in a user-selected manner directed to informing a vehicle occupant of the vehicle proximity condition, and directed to suggesting to the occupant a vehicle control command that is responsive to the proximity condition.

In another aspect of the embodiments described herein, a method of operating at least a portion of a vehicle responsive to the occurrence of a vehicle proximity condition is provided. The method includes a step of operating at least a portion of the vehicle as a haptic device in a user-selected manner directed to informing a vehicle occupant of the vehicle proximity condition, and to suggesting to the occupant a vehicle control command that is responsive to the proximity condition.

In another aspect of the embodiments described herein, a computing device for a vehicle proximity condition detection and haptic notification system is provided. The device includes one or more processors for controlling operation of the computing device, and a memory for storing data and program instructions usable by the one or more processors, wherein the one or more processors are configured to execute instructions stored in the memory to operate, upon detection of a vehicle proximity condition, an active suspension system of the vehicle so as to tilt the vehicle and/or so as to generate at least one pulse at one or more wheels of the vehicle.

DETAILED DESCRIPTION

The present disclosure describes embodiments of a vehicle proximity condition detection and haptic notification system. The system is configured to, upon detection of a vehicle proximity condition, operate at least one portion of the vehicle as a haptic device in a user-selected manner directed to informing a vehicle occupant of the vehicle proximity condition, and also directed to suggesting to the occupant a vehicle control command that is responsive to the proximity condition. A "vehicle proximity condition" may be defined as any one of several predetermined spatial relationships between the ego-vehicle and one or more additional vehicles. The various vehicle situations and conditions to which the system is configured to respond relate to the ego-vehicle's position with respect to other vehicles in traffic. Representative examples of vehicle proximity conditions described herein include a condition where the following distance of the ego-vehicle from a preceding vehicle in the same lane is too small; a condition where one or more other vehicles approach too closely to the ego-vehicle; a condition in which it is deemed safe for the ego-vehicle to change lanes; and a condition where another vehicle approaches the ego-vehicle too closely from behind the ego-vehicle. Other proximity conditions are also possible and may be accounted for in embodiments of the proximity condition detection and haptic notification system described herein.

The vehicle proximity condition detection and haptic notification system may respond to the proximity condition in any of a variety of ways. For example, the vehicle may be configured to respond by tilting portions of the vehicle; by tilting the driver's seat; by elevating or depressing the driver's seat; by generating a pulse in the driver's seat, in the steering wheel, or at one or more of the vehicle wheels; or by generating a vibration in the driver's seat or in the steering wheel. The vehicle responses may be selected by the user and are designed to inform a vehicle occupant of the vehicle proximity condition, and to suggest to the occupant a vehicle control command that is responsive to the proximity condition.

Operation of the seat and suspension as haptic devices to elevate and/or tilt portions of the vehicle and/or seat in a given direction are also designed to produce a feeling in the driver of gravitation or levitation toward the given direction. This feeling is designed to be consistent with the driver's intuition regarding the direction to move the vehicle in response to a given proximity condition. This may aid in increasing the driver's awareness of the proximity condition and also in compressing the driver's response time to the proximity condition. This intuition may be expressed by the driver's selections of the particular haptic stimuli to be provided in response to the various vehicle proximity conditions, as described in greater detail below.

Figure 1:
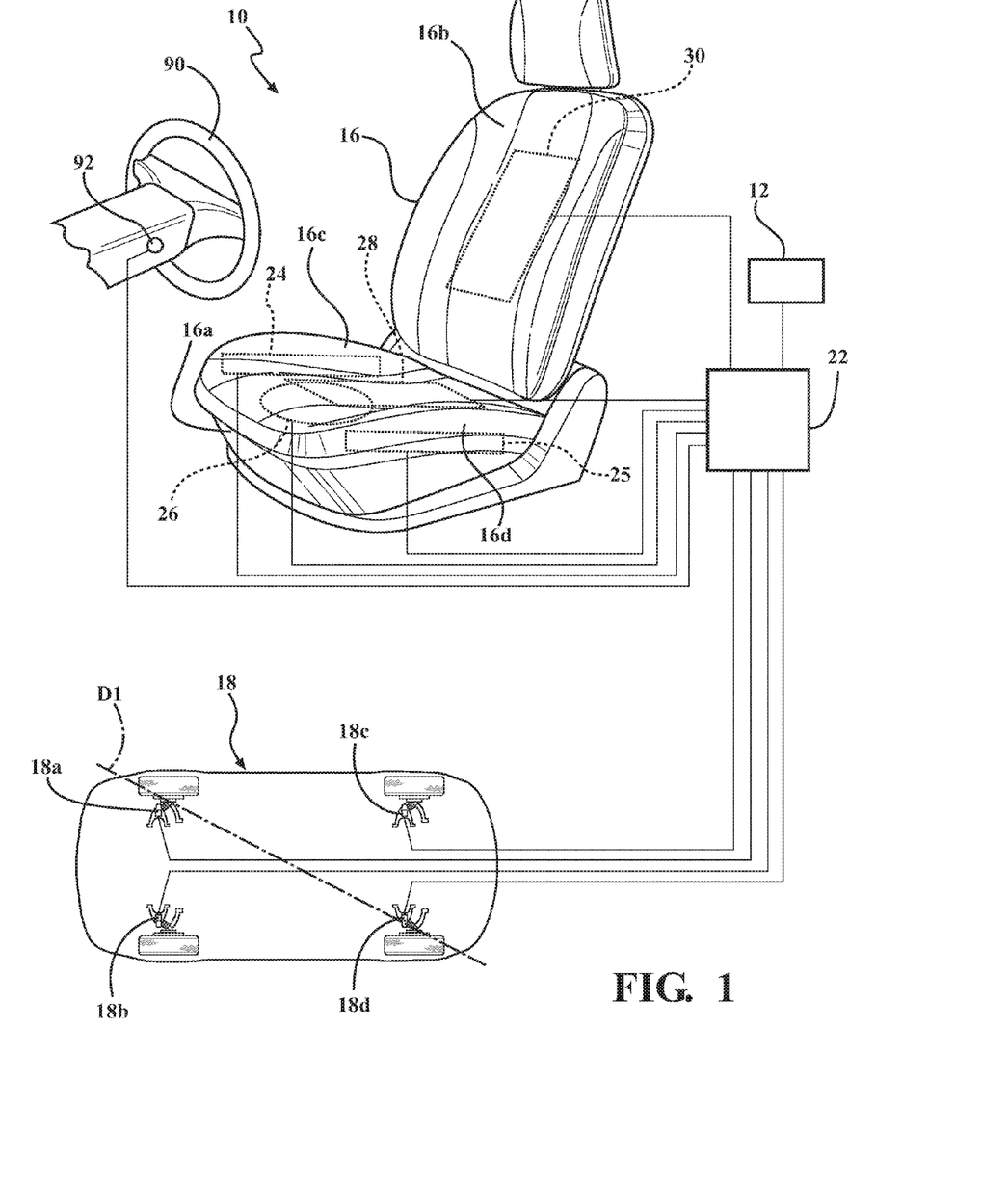
FIG. 1 shows a vehicle proximity condition detection and haptic notification system 10 in accordance with one embodiment described herein.

FIG. 1 shows a vehicle proximity condition detection and haptic notification system 10 in accordance with one embodiment described herein. The vehicle proximity condition detection and haptic notification system 10 is incorporated into an ego-vehicle 20 (FIG. 3) and is operable to detect various traffic-related conditions or situations that may be encountered by the vehicle while driving, and to notify the driver (and, optionally, other vehicle occupants) of the conditions and situations. As used herein, a "vehicle proximity condition" is defined as any one of several predetermined or predefined spatial relationships between the ego-vehicle and one or more additional vehicles. The vehicle haptic responses to each spatial relationship (and, to some degree, the parameters of the spatial relationships) may be selected or defined by a user or vehicle occupant. The various proximity conditions to which the system 10 is configured to respond relate to the ego-vehicle's position with respect to other vehicles in traffic. Representative examples of vehicle proximity conditions described herein include a condition where the following distance of the ego-vehicle from a preceding vehicle in the same lane is too small; a condition where one or more other vehicles approach too closely to the ego-vehicle; a condition in which it is deemed safe for the ego-vehicle to change lanes; and a condition where another vehicle approaches the ego-vehicle too closely from behind the ego-vehicle. Other proximity conditions are also possible and may be accounted for in embodiments of the proximity condition detection and haptic notification system described herein.

Referring to FIG. 1, system 10 includes one or more vehicle sensors 12, a computing device 22 in operative communication with sensors 12, and one or more vehicle systems or components 16, 18 configured to operate as haptic devices, to provide information to a driver or vehicle occupant responsive to control signals received from computing device 22. As described herein, portions of the vehicle are used in a user-defined manner as haptic devices to produce felt sensations in the various parts of the body of a vehicle occupant. These sensations inform the vehicle occupant of the various proximity conditions, and may be used to suggest control commands to the vehicle occupant which are responsive to the detected proximity conditions.

Vehicle sensors 12 are configured to measure various vehicle parameters and to provide vehicle operational information to other vehicle components, for example computing device 22. For the purposes described herein, certain sensors are configured for detecting the positions of any surrounding vehicles in relation to the position of the ego-vehicle (i.e., the vehicle in which the sensors are installed). Vehicle sensors 12 may include any sensors suitable for providing the data of information usable for the purposes described herein. Examples (not shown) of sensors that may be incorporated into the vehicle 20 include radar and lidar systems, laser scanners, vision/camera systems, GPS systems, proximity sensors, various inertial sensors such as gyroscopes and accelerometers, vehicle wheel speed sensors, road condition sensors, suspension height sensors, steering angle sensors, steering torque sensors, brake pressure sensors, accelerator or pedal position sensor, and tire pressure sensors.

The data or information provided by any of sensors 12 may be integrated or combined with other data or information in a sensor fusion step using, for example, a suitable Kalman filter (not shown). Also, if required, data or information transmitted within or to vehicle 20 may be processed in an A/D converter, D/A converter or other processing means (not shown) for example, prior to further processing or other operations performed on the information by other vehicle elements or systems.

Figure 2:
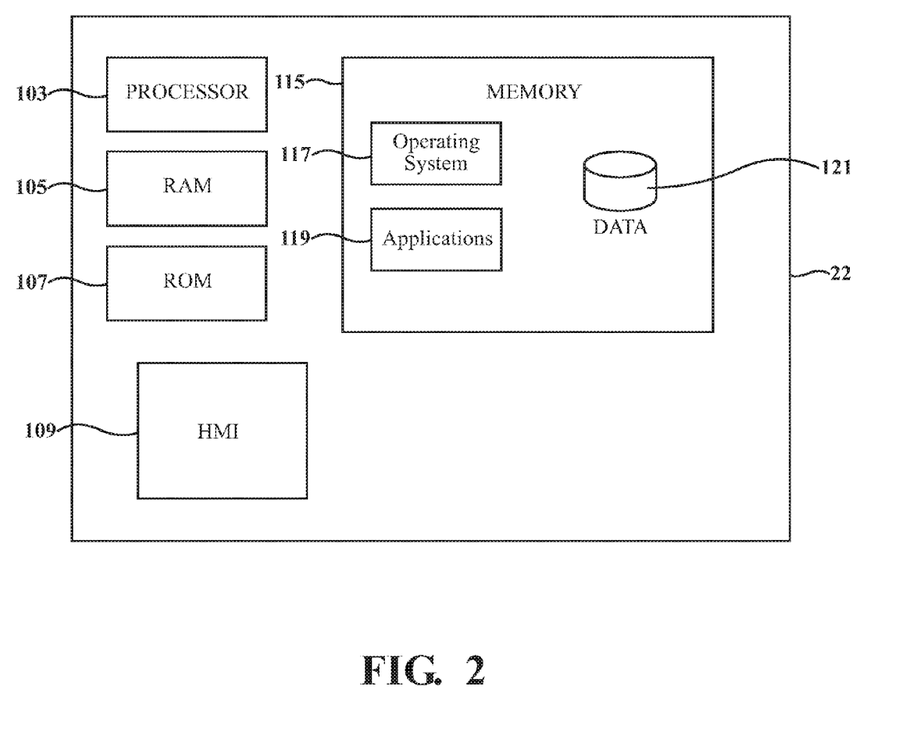
FIG. 2 illustrates a block diagram of a computing device configured for controlling operation of various portions of the vehicle as haptic devices.

FIG. 2 illustrates a block diagram of computing device 22, which is configured for controlling operation of the haptic devices described herein. Computing device 22 may also control other aspects of vehicle operation. Computing device 22 includes one or more processors 103 for controlling overall operation of the device 18 and its associated components, including RAM 105, ROM 107, input/output module or HMI (human machine interface) 109, and memory 115. The computing device 22 may be configured for transmitting and receiving vehicle-to-vehicle (V2V) communications, and for collecting and/or receiving vehicle sensor data and other information.

The computing device 22 is also configured for receiving vehicle operation and status information from sensors 12. In addition, responsive to the information received from sensors 12 and other pertinent vehicle operational information, the computing device 22 is configured to formulate and transmit control signals to the various haptic devices (such as devices 16, 18) for operating the haptic devices. The computing device 22 may also be configured for communication with various vehicle-based devices (e.g., on-board vehicle computers, short-range vehicle communication systems, telematics devices), mobile communication devices (e.g., mobile phones, portable computing devices, and the like), roadside stations or devices and/or other remote systems (such as GPS systems).

Software may be stored within memory 115 and/or storage to provide instructions to processor 103 for enabling device 18 to perform various functions. For example, memory 115 may store software used by the device 22, such as an operating system 117, application programs 119, and an associated internal database 121. Processor 103 and its associated components may allow the proximity condition detection and haptic notification system 10 to execute a series of computer-readable instructions to perform the functions described herein.

An Input/Output (I/O) or HMI (human-machine interface) 109 may include a microphone, keypad, touch screen, and/or stylus through which a user of the computing device 22 may provide input, and may also include one or more of a speaker for providing audio output and a video display device for providing textual, audiovisual and/or graphical output. HMI 109 may also be configured for providing output to mobile communication devices (e.g., mobile phones, portable computing devices, and the like).

Referring to FIG. 1, one or more vehicle systems or components configured to operate as haptic devices are in operative communication with computing device 22. In the embodiment shown, the haptic devices may include a vehicle active suspension system 18 and a driver seat 16. Other vehicle systems or components may also be configured to operate as haptic devices in the manner described herein, depending on the requirements of a particular application.

In one embodiment, the vehicle incorporates an active suspension system 18 which may be configured to operate as a haptic device. A schematic representation of the active suspension system 18 in an ego-vehicle 20 is shown in FIG. 1. In a manner known in the art, the system 18 includes independently operable actuation and control means 18*a*, 18*b*, 18*c* and 18*d* located at each vehicle wheel. This enables the corner of the vehicle proximate each wheel to be independently controlled, for raising and lowering each wheel, for varying the shock-absorbing characteristics of each wheel, and for controlling other parameters as known in the art. In a particular embodiment described herein, the suspension system 18 is configured to receive control signals from computing device 22 and to raise and/or lower portions of the vehicle near the wheels responsive to the received control signals.

The active suspension system 18 may be configured to operate in any of a variety of ways responsive to control signals from computing device 22, so as to convey various types of information to a driver and/or other vehicle occupant.

For example, the system 18 may be configured to generate a short-duration pulse to one or more of the suspension system actuators responsive to control signals. The pulse may tend to momentarily either lift or lower the affected portion of the vehicle, depending on the particular application. The pulse is of sufficient magnitude and duration so that the pulse itself and the location of the driven actuator may easily be discerned by the driver and/or other vehicle occupant. The pulse is also short enough in relation to the actuator response time so that no appreciable lifting or lowering of the pertinent portion of the vehicle is effected by the pulse. Thus, the pulse effectively serves the purpose of attracting the attention of the driver, in order to alert the driver to a particular proximity condition and (optionally) to urge the driver to take a particular action.

Pulses generated within haptic devices as described herein may be used to convey any of numerous types of information and/or vehicle proximity conditions to the vehicle occupants. For example, depending on the application, the location of the pulse may be indicative of a direction in which the vehicle should be moved by the driver. A single pulse may be generated, or a repeating series of pulses may be generated. The series of pulses may continue until the condition prompting haptic operation of the vehicle system or elements no longer applies. The system 10 may also be configured to permit a vehicle occupant or user to select the pulse generation frequency according to personal preferences and/or the requirements of a particular application.

Active suspension system 18 may also be configured to lift, lower and/or tilt portions of the vehicle (or the entire vehicle) responsive to control signals. For example, suspension actuator means 18*a*, 18*b*, 18*c* and/or 18*d* positioned proximate associated vehicle wheels may be controlled so as to lower the front portion of the vehicle while raising the rear portion of the vehicle, thereby tilting the vehicle forward. In a similar manner, the rear of the vehicle may be lowered while raising the front, thereby tilting the vehicle toward the rear. In a similar manner, the vehicle may be tilted toward the right or left sides by raising the vehicle at the wheels on one side and/or lowering the vehicle at the wheels on the opposite side.

Alternatively, the vehicle may be raised at the locations of wheels positioned diagonally with respect to each other (for example, at the right front and left rear wheels at which actuation means 18*a* and 18*d* are located), while also raising the vehicle at the right rear wheel using actuation means 18*c*. This has the effect of tilting the vehicle about the right front-left rear diagonal D1 and in the direction of actuation means 18*b* (FIG. 1) and the left front wheel, which may be raised using actuation means 18*b* to facilitate the tilting. In a similar manner, the vehicle may be tilted toward any of the remaining wheels.

Operation of the seat and suspension as haptic devices to elevate and/or tilt portions of the vehicle and/or seat in a given direction are also designed to produce a feeling in the driver of gravitation or levitation toward the given direction. This feeling is designed to be consistent with the driver's intuition regarding the direction to move the vehicle in response to a given proximity condition. This may aid in increasing the driver's awareness of the proximity condition and also in compressing the driver's response time to the proximity condition. This intuition may be expressed and reinforced by the driver's selections of the particular haptic stimuli to be provided in response to the various vehicle proximity conditions, as described in greater detail below.

The suspension system may also be configured to perform any combination of the above types of actuation. For example, one or more pulses may be generated in one of actuation means 18*a*-18*d*, while other actuation means are controlled to raise or lower a corresponding portion of the vehicle. In addition, a pulse may be generated in an actuation means while the actuation means is being used to raise or lower a portion of the vehicle.

In one embodiment, seat 16 is configured to be operable as a haptic device. In one embodiment, seat 16 is a driver's seat. However, the seat may alternatively be a passenger seat. In another embodiment, both the driver's seat and the front passenger seat are configured as haptic devices as described herein. Depending on the vehicle design, any seat may be configured as a haptic device.

In one embodiment, seat 16 includes a seat bottom 16*a* and seat back 16*b* operatively coupled to and extending from the seat bottom. Seat 16 may also include side bolsters 16*c* and 16*d* attached to associated sides of the seat. Seat 16 may also include one or more armrests (not shown) attached to associated sides of the seat. In a particular embodiment, each of the seat bottom 16*a*, seat back 16*b* side bolsters 16*c*, 16*d* and any armrests are configured to operate as independently actuatable haptic devices.

Seat bottom 16*a* may be structured to be tiltable with respect to the vehicle floor on which the seat is mounted, thereby enabling the tilting of the entire seat. The seat may be automatically tiltable independently of the remainder of the vehicle, toward the vehicle left, right, forward and backward directions responsive to control signals received from computing device 22.

In addition, as well as being controllable manually for driver comfort, seat 16 may also be structured to be automatically raisable and lowerable with respect to the vehicle floor responsive to computing device control commands when the seat 16 is used as a haptic device.

For purposes of raising and lowering the seat and tilting the seat, the seat may be coupled to the floor by one or more motorized mechanisms configured to receive control commands from either the computing device or a manual control lever, in a manner known in the art.

In one embodiment, the vehicle is configured so that a short-duration pulse as previously described may be generated in either (or both) of the seat back 16*b* and the seat bottom 16*a*. The seat pulses are embodied in forces of sufficient magnitude and duration so that the pulse may easily be discerned by a vehicle occupant sitting in the seat. For this purpose, a suitable actuator or pulse generator 30 may be incorporated into the seat back 16b. Also, a suitable actuator or pulse generator 28 may be incorporated into the seat bottom 16a. The pulse generators 28 and 30 are independently operable responsive to a control signal from computing device 22, and may be operated singly or in conjunction with each other depending on the requirements of a particular application. In addition, suitable independently operable actuators or pulse generators 24 and 25 may be incorporated into the seat bolsters 16c and 16d. Also, a suitable actuator or pulse generator (not shown) may be incorporated into each of the seat armrests (not shown).

In another aspect, the vehicle may be configured so that a vibration may be generated in either (or both) of the seat back 16b and the seat bottom 16a. For this purpose, a suitable vibration generator (not shown) may be incorporated into the seat back and/or seat bottom. The various vibration generators may be independently operable responsive to control signals received from computing device 22, and may be operated singly or in conjunction with each other depending on the requirements of a particular application. In addition, suitable independently vibration generators (not shown) may be incorporated into the seat bolsters 16c and 16d. Also, a suitable vibration generator (not shown) may be incorporated into each of the seat armrests (not shown).

In another aspect, the vehicle may be configured so that a pulse or vibration may be generated in the steering wheel 90. For this purpose, a suitable vibration or pulse generator 92 may be incorporated into the steering wheel. The generator 92 may be independently operable responsive to control signals received from computing device 22, and may be operated alone or in conjunction with other generators or actuators depending on the requirements of a particular application.

Computing device 22 may operate the various haptic devices in any of a number of ways to inform the vehicle occupants of various predetermined driving situations and conditions. Examples of conditions to which the computing device may be programmed to react include conditions where the following distance of an ego-vehicle behind a preceding vehicle in the same lane is too small; where the ego-vehicle is driving too slowly or at a speed too far below the applicable speed limit; where another vehicle encroaches into a predefined radius or space envelope established around the ego-vehicle; and when safe conditions exist for making a desired lane change.

For example, in one embodiment, the proximity detection and haptic notification system 10 is configured to detect a condition where the following distance of an ego-vehicle behind a preceding vehicle in the same lane is too small. This condition may be detected in a known manner by forward-looking ego-vehicle sensors (for example, radar). The system 10 may also be configured to notify the driver of this condition by tilting the driver's seat toward the rear of the vehicle, by tilting the front portion of the vehicle upwardly relative to the rear of the vehicle, or both. This may serve as an indication that the driver should decelerate the vehicle to increase the following distance.

In situations where it is desired to tilt the seat 16, the seat may be elevated simultaneously with the tilting of the seat. This may enable a greater relative tilt angle to be achieved while also reinforcing the awareness of (and impact on) the occupant of the tilting effect.

The system 10 may alternatively be configured to notify the driver of the low following distance condition by generating a pulse or series of pulses in the seat bottom, seat back or other portion of the seat. The pulse or series of pulses may also be generated at the wheels by the active suspension system, to simulate a "bump" that might be produced if the vehicle or wheels made contact with an obstacle or other vehicle. Alternatively, the system 10 may alternatively be configured to notify the driver of the low following distance condition by generating vibrations in the seat bottom, seat back or other portion of the seat. Any of these options may serve as an indication that the driver should decelerate the vehicle to increase the following distance. The driver may select any of these notification options based on personal preference.

In another situation, the system 10 is configured to detect a condition where the ego-vehicle is driving too slowly for traffic conditions in the lane the ego-vehicle is currently driving in. For example, the system 10 may determine that such a situation exists responsive to multiple occurrences of vehicles approaching the ego-vehicle from the rear at a higher speed than that at which the ego-vehicle is traveling, and then changing lanes. In a particular embodiment, such a situation may be determined with reference to GPS map information (if available) relating to applicable speed limits on the section of road where the ego-vehicle is traveling, or by a operation of a vehicle vision system and associated pattern recognition routines capable of determining the applicable speed limits from posted signs along the road. If the ego-vehicle appears to be traveling too slowly for traffic conditions but is traveling at or close to the applicable speed limit, operation of the haptic device(s) to inform the ego-vehicle driver of a "low speed" condition may be inhibited, to prevent the ego-vehicle from exceeding the speed limit.

The system 10 may also be configured to notify the driver of this condition by tilting the driver's seat toward the front of the vehicle, by tilting the rear portion of the vehicle upwardly relative to the front of the vehicle, or both. This may serve as an indication that the driver should accelerate the vehicle to increase speed. The system 10 may alternatively be configured to notify the driver of the "low-speed" condition by generating a pulse or series of pulses in the seat bottom, seat back or other portion of the seat. The pulse or series of pulses may also be generated at the vehicle rear wheels by the active suspension system, to simulate a "bump". Any of these options may serve as an indication that the driver should decelerate the vehicle to accelerate the vehicle to increase speed. The driver may select any of these options based on personal preference.

In another aspect, the system 10 is configured to detect safe conditions for a desired lane change. This aspect of the system 10 may be activated in response to activation of a vehicle turn signal by the driver when the vehicle is traveling at a speed above a predetermined speed. This helps to distinguish a lane change situation from a situation where the vehicle is signaling because it is turning a corner, for example. Activation of this aspect of the system 10 responsive to turn signal activation also helps ensure that the turn signal is operated prior to the lane change, to alert other drivers to the pending ego-vehicle lane change.

Figure 3:
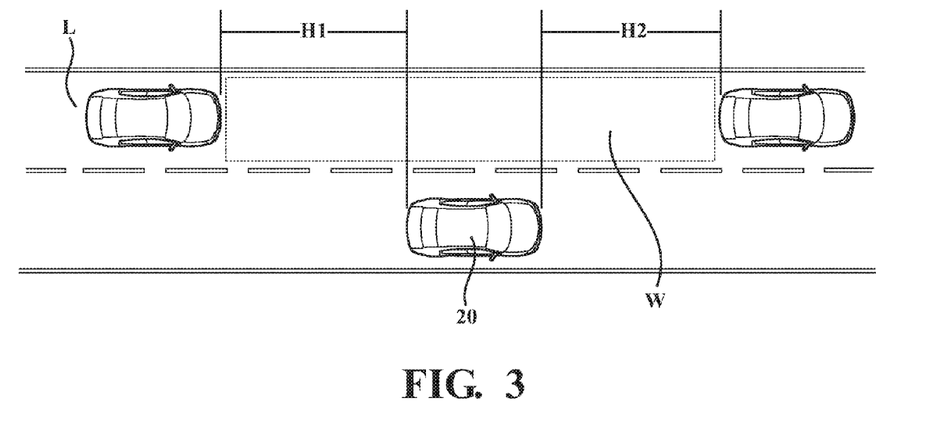
FIG. 3 is a schematic diagram showing conditions facilitating a lane change of an ego-vehicle, in accordance with an embodiment described herein.

Criteria for safe lane change conditions may be based on any of a variety of factors. Referring to FIG. 3. in one embodiment, safe lane change conditions are based on the detected absence of another vehicle in an adjacent lane, both next to the ego-vehicle, within a predetermined distance H1 from the front of the ego-vehicle, and within a predetermined distance H2 from the rear of the ego-vehicle. These predetermined distances may be based on the speeds at which the ego-vehicle and vehicles in the adjacent lane are traveling. The computing device 22 may be configured to constantly receive sensor information relating to the vehicle speeds, and to constantly calculate and update the predetermined distances so that they are available when a lane change is desired.

The system 10 may be configured to, upon activation of the turn signal, constantly compare the existing ego-vehicle proximity condition to the most-recently calculated safe lane change criteria, while also continuing to update the safe predetermined distances H1 and H2 from other vehicles based on latest vehicle speed information. The system 10 may also be configured to alert the driver to the occurrence of safe lane change conditions by, for example, tilting the seat in the direction of the target lane L. Alternatively, or in addition to tilting the seat, the active suspension may tilt the entire vehicle in the direction of the target lane. In another particular embodiment, the system 10 is configured to produce a vibration or repeating pulse in one of seat bolster pulse generating means 24 and 25 of in an armrest on the side of the seat closest to the target lane. Other actuation options may be provided for selection by the vehicle occupant, based on personal preference.

Figure 5:
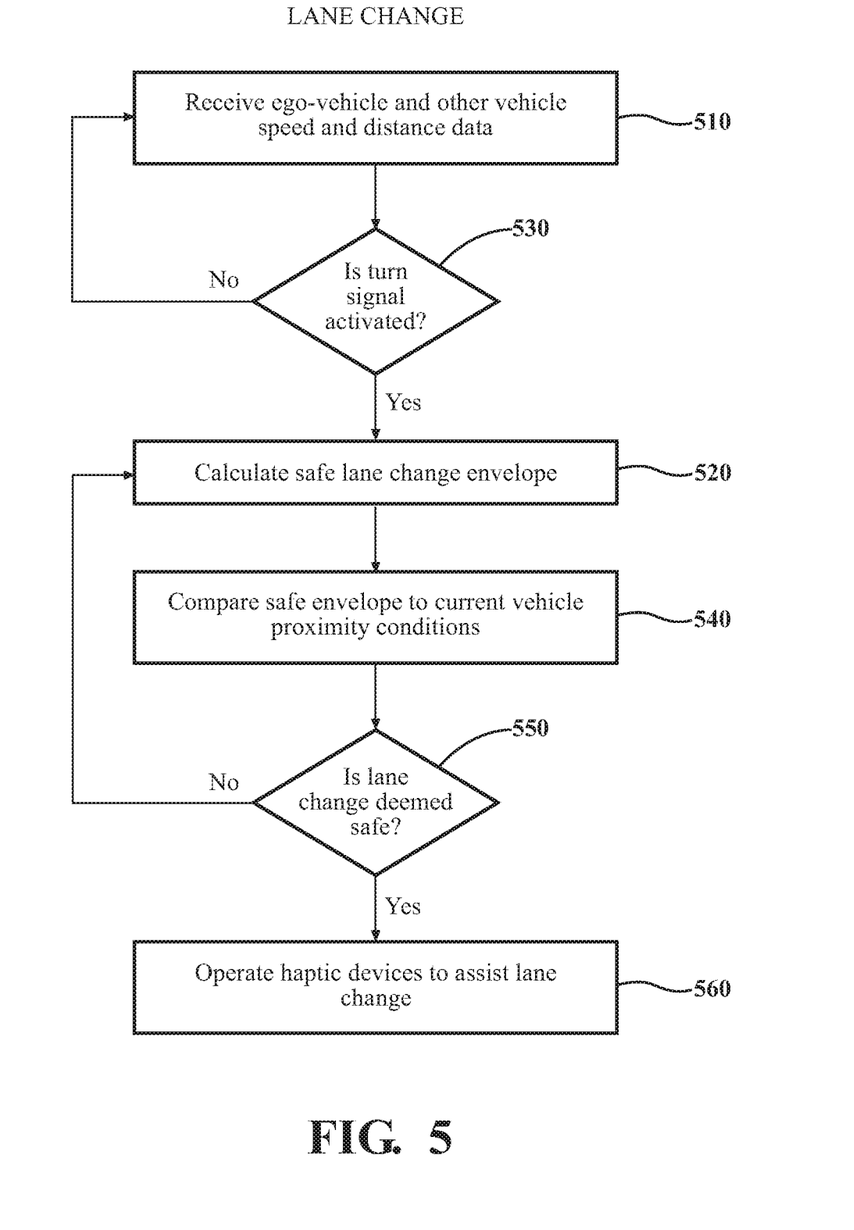
FIG. 5 shows a process flow for detecting a vehicle proximity condition in which a safe lane change of the ego-vehicle is facilitated.

FIG. 5 shows a process flow for detecting a vehicle proximity condition in which a safe lane change of the ego-vehicle is facilitated.

In block 510, the computing device 22 receives ego-vehicle data and data relating to other, surrounding vehicles from sensors 12. This data may be received on an ongoing basis so as to stay abreast of vehicle conditions and changes in the traffic flow.

In block 530, the computing device determines whether the turn signal has been activated. If the turn signal has not been activated, the control system waits until turn signal indicates that a lane change is desired. In block 520, if the turn signal has been activated, the computing device 22 uses the latest received ego-vehicle data (including values of parameters H1, H2, and other pertinent parameter values) to calculate a safe lane change envelope (for example, H1+H2+ the length of the ego-vehicle) that must be present before the haptic devices will be operated to indicate that the lane change is deemed to be safe.

In block 540, the current vehicle proximity condition is compared with the safe lane change envelope.

In block 550, if no other vehicles reside within the safe lane change envelope, the desired lane change may be deemed safe. If the lane change is not deemed to be safe, control reverts to block 520 for recalculation of the safe lane change envelope based on the latest sensor data, and a re-comparison of the new safe lane change envelope with the latest vehicle proximity conditions (as indicated by the latest sensor data). The cycle 520-550 continues until the lane change is deemed to be safe.

In block 560, if the lane change is deemed to be safe, the computing device 22 operates one or more vehicle components and/or systems as haptic devices as described herein, to indicate to the driver the safe lane change condition.

Figure 4:
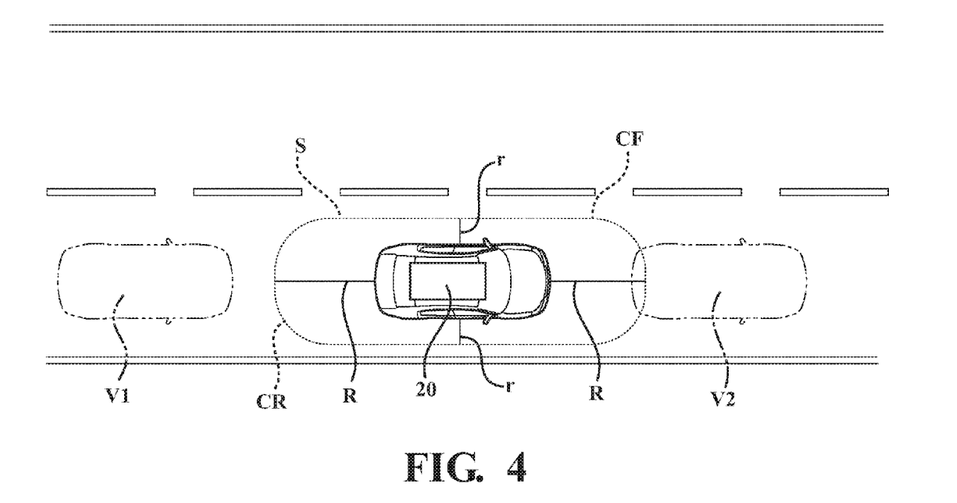
FIG. 4 is a schematic diagram of a virtual space envelope surrounding an ego-vehicle, in accordance with an embodiment described herein.

In another aspect, the system 10 is configured to detect incursion or encroachment of another vehicle into a predetermined virtual space envelope S established around the ego-vehicle for safety/warning purposes. The parameters of the space envelope may be defined by the driver or other vehicle occupant, using HMI 109 or other suitable interface. One example of a vehicle space envelope S is shown in FIG. 4. The space envelope boundary may be defined so as to reside at a relatively greater distance R from the front and rear of the ego-vehicle, to allow for vehicle following distances. The space envelope boundary may also be defined so as to reside at a relatively smaller distance r from the sides of the ego-vehicle, to allow for the relatively closer proximity of vehicles traveling in adjacent lanes. The various distances of the envelope boundaries from the portions of the vehicle may also differ from one another, if desired. The space envelope is defined by configuring the computing device 22 to react to sensor detection of another vehicle approaching to within a predetermined distance of a portion of the ego-vehicle. The predetermined distance may be defined by a user using HMI 109.

The system 10 is also configured to respond to penetration of the space envelope by operating one or more haptic devices to alert the vehicle occupants. That is, portions of the vehicle are operated as haptic devices to alert the vehicle occupants of the other vehicle when the other vehicle to within a predetermined distance of the ego-vehicle, as defined by the space envelope. In one embodiment, the system 10 is configured to respond to incursion of the space envelope at the front of the ego-vehicle by generation of a short-duration pulse as previously described at one or more front wheels of the ego-vehicle by the active suspension system. This pulse creates a virtual or simulated "bump" effect, alerting the vehicle occupants to the presence of another vehicle within the space envelope at the front of the ego-vehicle. Alternatively, or in addition to a pulse applied at the vehicle front wheels, a pulse may be generated in the seat back 16b and/or seat bottom 16a to simulate or reinforce the "bumping" effect.

In addition, if desired, the user may program the computing device 22 to provide a haptic stimulus which suggests to the vehicle occupant a control command or course of action responsive to the detected vehicle proximity condition. For example, simultaneously with (or subsequent to) generation of an occupant-detectable pulse, the system 10 may tilt the seat 16 and/or the vehicle to the rear as previously described to indicate to the driver that the vehicle should be decelerated to increase following distance.

In a similar application, the system 10 may be configured to respond to incursion of the space envelope at the front of the ego-vehicle and in an adjacent lane (i.e., at a "corner" CF of the space envelope) by generation of a pulse only at the front wheel closest to the adjacent lane. This pulse creates a virtual or simulated "bump" effect at the pertinent corner of the ego-vehicle, alerting the vehicle occupants to the presence of another vehicle at the front corner of the space envelope. Alternatively, or in addition to an impulse applied to the one or more vehicle front wheels, an impulse may be generated in the seat back 16b and/or seat bottom 16a to simulate or reinforce the "bump" effect.

In addition, if desired, the user may program the computing device to provide a haptic stimulus which suggests to the vehicle occupant a control command or course of action responsive to detection of the proximity condition. For example, simultaneously with (or subsequent to) application of the impulse, the system 10 may tilt the seat 16 and/or the vehicle to the rear as previously described to indicate to the driver that the vehicle should be decelerated to increase following distance.

Similarly, the system 10 may configured to respond to incursion of the space envelope at the rear of the ego-vehicle (and in the same lane as the ego-vehicle) by generation of a pulse as previously described at one or more rear wheels of the ego-vehicle. This pulse creates a virtual or simulated "impact" effect, alerting the vehicle occupants to the presence of another vehicle within the space envelope behind the ego-vehicle. Alternatively, or in addition to a pulse applied to one or more vehicle rear wheels, a pulse may be generated in the seat back 16b and/or seat bottom 16a to simulate the "bump" effect.

In a similar application, the system 10 may be configured to respond to incursion of the space envelope at the rear of the ego-vehicle and in an adjacent lane (i.e., at a "corner" CR of the space envelope) by generation of an impulse only at the rear wheel closest to the adjacent lane. This impulse creates a virtual or simulated "impact" effect at the pertinent corner of the ego-vehicle, alerting the vehicle occupants to the presence of another vehicle at the rear corner of the space envelope.

In addition, if desired, the user may program the controller to provide a haptic stimulus which suggests to the vehicle occupant a course of action needed to alleviate or mitigate the situation prompting operation of the haptic device. For example, simultaneously with (or subsequent to) application of the impulse, the system 10 may tilt the seat 16 and/or the vehicle toward the front as previously described to indicate to the driver that the vehicle should be accelerated to increase the distance to the following vehicle.

The system 10 may also be configured to respond to incursion of the space envelope at either side of the ego-vehicle by generation of a pulse as previously described at one or more wheels of the ego-vehicle along the pertinent side. This pulse creates a virtual or simulated "bump" effect alerting the vehicle occupants to the presence of another vehicle within the space envelope at the side of the ego-vehicle. Alternatively, or in addition to a pulse applied at one or more vehicle wheels along the side, an impulse may be generated in the seat back 16b and/or seat bottom 16a to simulate the "bump" effect.

In a particular embodiment, if desired, the user may choose to employ the lane change assistance feature described above, in conjunction with the space envelope side incursion feature. The user may select a system 10 configuration which, if a safe lane change condition has been detected by the system 10, causes the seat 16 and/or the vehicle (through the active suspension system) to be tilted toward a side of the vehicle opposite the side of the incursion, to indicate to the driver that the vehicle may be safely moved into an adjacent lane, in a direction away from the other vehicle.

In this aspect, the system 10 may be configured to automatically activate the turn signal to indicate to other drivers that the ego-vehicle may change lanes responsive to the space-envelope incursion.

In addition to the vehicle responses described above, other haptic notifications may be used, or any combinations of the above notifications may be used. Alternatively, each portion of the vehicle just described may be operated in a fashion different from that just described in response to a vehicle proximity conditions, according to user preferences selectable using HMI 109. In addition, the portions of the vehicle just described may be operated in response to other vehicle proximity conditions. Alternatively, other actuatable portions of the vehicle may be operated by the computing device 22 in response to the vehicle proximity conditions just described or in response to other vehicle proximity conditions.

In any of the above-described implementations of the various haptic devices, the system 10 may be configured to cease pulse generation, tilting and/or other operation of the haptic devices, and to return the vehicle to a normal operating mode when the condition prompting operation of the haptic notification system has ended.

The driver or user may specify (using HMI 109 or another suitable interface) how the various vehicle systems will be operated as haptic devices in response to the various vehicle proximity conditions. This enables a user to specify or tailor the vehicle response in terms that may be more intuitive to the user and/or more easily remembered by the user in an emergency. For example, the system 10 may be configured to permit the vehicle owner or other vehicle occupant to choose, from among a menu of options, the method the vehicle will use to notify the occupant of the occurrence of a particular condition. The system 10 may be configured to permit the vehicle owner or other vehicle occupant to specify the boundaries of a virtual space envelope defined by the vehicle sensors.

Figure 6A:
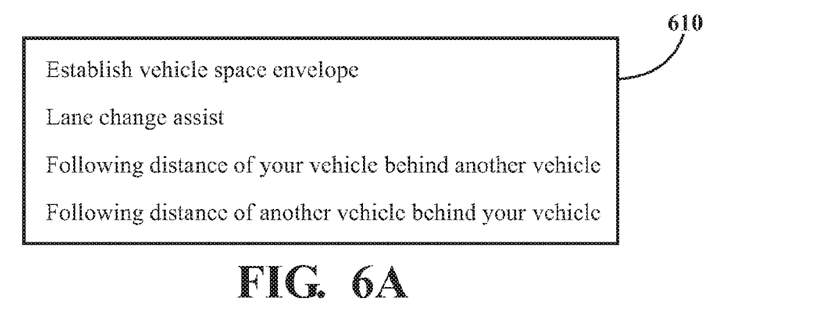
FIGS. 6A-6C show exemplary embodiments of successive touch screen menus enabling user selection of haptic response options for given vehicle proximity conditions.
Figure 6B:
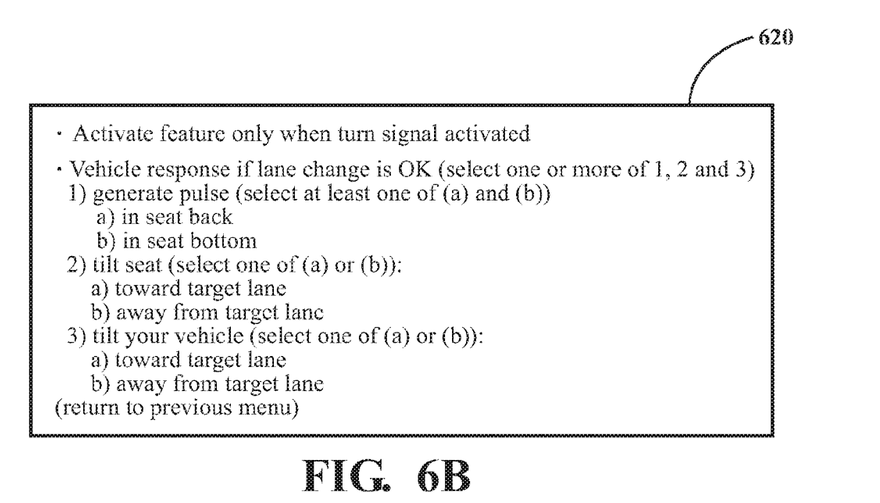
Figure 6C:
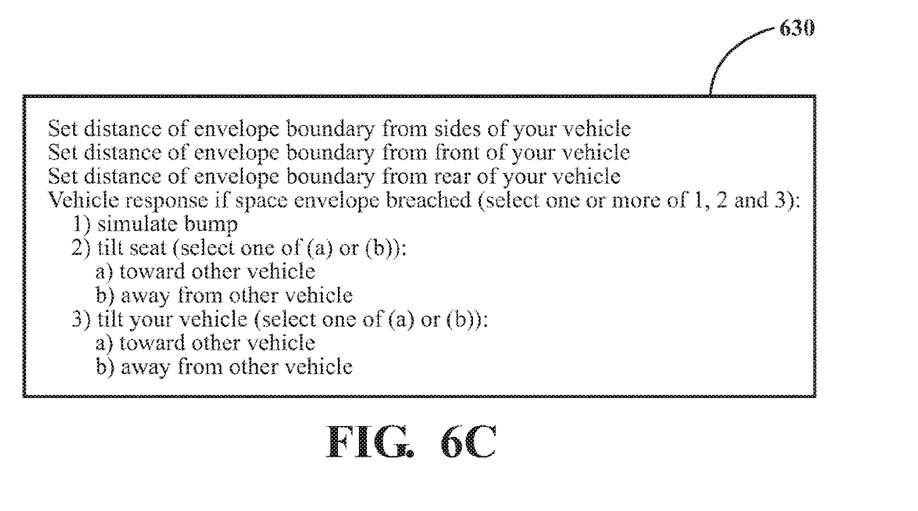

FIGS. 6A-6C show exemplary embodiments of successive touch screen menus enabling user selection of haptic response options for given vehicle proximity conditions. In FIG. 6A, the user touches the screen 610 to activate the "lane change assist" feature. This selection leads to the menu shown in FIG. 6B, which enables the user to select the haptic stimuli which will be produced responsive to detection of a safe lane change condition. If the user touches the screen to activate the "Vehicle Space envelope" option in screen 610, the screen shown in FIG. 6C may then be displayed. This enables the user to select the haptic stimuli which will be produced responsive to incursion of another vehicle into the ego-vehicle space envelope. In addition, the user can specify the distances of the envelope boundary from the sides, front and rear of the ego-vehicle.

In a particular embodiment, minimum and/or maximum allowable limits for the space envelope dimensions may be pre-set by the vehicle or system manufacturer. The above screen examples are exemplary, and other or additional haptic options and/or alternative modes of presentation may be offered.

In embodiments described herein, the characteristics of any generated pulse may be tailored to various aspects of the condition prompting generation of the pulse. For example, the magnitude of a pulse generated in response to incursion of another vehicle into the ego-vehicle's space envelope may be varied according to the speed of the other vehicle and/or the proximity of the other vehicle to the ego vehicle. If the other vehicle intrudes into the space envelope suddenly and/or at a relatively great speed so that it is closing rapidly with the ego-vehicle, the pulse magnitude may be relatively greater than if the other vehicle is closing relatively slowly with the ego-vehicle and/or is still driving at a relatively greater distance from the ego-vehicle.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computing device for a vehicle proximity condition detection and haptic notification system, the device comprising:
   one or more processors for controlling operation of the computing device, and
   a memory for storing data and program instructions usable by the one or more processors, wherein the one or more processors are configured to execute instructions stored in the memory to:

enable a user to specify, operation of an active suspension system of an ego-vehicle so as to tilt one of a left or right side of the ego-vehicle upwardly relative to a side of the ego-vehicle opposite the one of the left or right side of the ego-vehicle upon detection of a first vehicle proximity condition, so as to provide a user-selected haptic response directed to informing an ego-vehicle occupant of the first vehicle proximity condition; and operate the active suspension system in accordance with the user's specification.

2. The computing device of claim 1 wherein the one or more processors are configured to execute instructions stored in the memory to:

enable a user to specify operation of a driver's seat of the ego-vehicle so as to tilt the seat independently of and simultaneously with the tilting of the one of the left or right side of the ego-vehicle upon detection of a second vehicle proximity condition, so as to provide a user-selected haptic response directed to informing an ego-vehicle occupant of the second vehicle proximity condition; and operate the driver's seat in accordance with the user's specification.

3. A vehicle comprising a computing device in accordance with claim 1.

4. A method of operating at least a portion of an ego-vehicle responsive to the occurrence of a vehicle proximity condition, comprising steps of:

enabling a user to specify operation of an active suspension system of the ego-vehicle so as to tilt the ego-vehicle to one of a left side of the ego-vehicle and a right side of the ego-vehicle responsive to the vehicle proximity condition, to provide a user selected haptic response directed to informing an-ego-vehicle occupant of the vehicle proximity condition; and operating the active suspension system in accordance with the user specification.

5. The method of claim 4, further comprising steps of:

enabling the user to specify a degree of tilt of the ego-vehicle to one of a left side of the ego-vehicle and a right side of the ego-vehicle responsive to the vehicle proximity condition, so as to provide a user-selected degree of the user-selected haptic response; and operating the ego-vehicle to provide the user-selected degree of tilt, responsive to the vehicle proximity condition.

6. A computing device for a vehicle proximity condition detection and haptic notification system, the device comprising:

one or more processors for controlling operation of the computing device, and a memory for storing data and program instructions usable by the one or more processors, wherein the one or more processors are configured to execute instructions stored in the memory to:

enable a user to specify operation of a driver's seat of an ego-vehicle so as to tilt the driver's seat in a direction of an adjacent lane next to the ego-vehicle as a haptic response to a safe lane change condition in which no other vehicle is detected in the adjacent lane within a predetermined distance from the front of the ego-vehicle and within a predetermined distance from the rear of the ego-vehicle, to provide a user-selected haptic response directed to informing an ego-vehicle occupant of the safe lane change condition, and directed to providing to an ego-vehicle occupant a prompt to select an ego-vehicle control command that is responsive to the safe lane change condition; and operate the active suspension system so as to tilt the entire ego-vehicle in accordance with the user specification.

7. The computing device of claim 6 wherein the one or more processors are configured to execute instructions stored in the memory to:

enable a vehicle occupant to choose, from among a menu of options, a haptic response to be provided by the ego-vehicle upon detection of a particular vehicle proximity condition; and operate the ego-vehicle to provide the chosen haptic response upon detection of the particular vehicle proximity condition.

8. The computing device of claim 7 wherein the one or more processors are configured to execute instructions stored in the memory to:

enable a vehicle occupant to specify a degree of the chosen haptic response to be provided by the ego-vehicle upon detection of the particular vehicle proximity condition, so as to provide a user-selected degree of the chosen haptic response; and operate the ego-vehicle to provide the user-selected degree of the chosen haptic response, upon detection of the particular vehicle proximity condition.

9. A computing device for a vehicle proximity condition detection and haptic notification system, the device comprising:

one or more processors for controlling operation of the computing device, and a memory for storing data and program instructions usable by the one or more processors, wherein the one or more processors are configured to execute instructions stored in the memory to:

enable a user to specify operation of an active suspension system of an ego-vehicle to tilt the entire ego-vehicle in the direction of an adjacent lane next to the ego-vehicle as a haptic response to a safe lane change condition in which no other vehicle is detected in the adjacent lane within a predetermined distance from the front of the ego-vehicle and within a predetermined distance from the rear of the ego-vehicle to provide a user-selected haptic response directed to informing an ego-vehicle occupant of the safe lane change condition, and directed to providing to an ego-vehicle occupant a prompt to select an ego-vehicle control command that is responsive to the safe lane change condition; and operate the active suspension system in accordance with the user's specification.

10. The computing device of claim 9 wherein the one or more processors are configured to execute instructions stored in the memory to:

enable a vehicle occupant to choose, from among a menu of options, a haptic response to be provided by the ego-vehicle upon detection of a particular vehicle proximity condition; and operate the ego-vehicle to provide the chosen haptic response upon detection of the particular vehicle proximity condition.

11. The computing device of claim 10 wherein the one or more processors are configured to execute instructions stored in the memory to:

enable a vehicle occupant to specify a degree of the chosen haptic response to be provided by the ego-vehicle upon detection of the particular vehicle proximity condition, so as to provide a user-selected degree of the chosen haptic response; and operate the ego-vehicle to provide the user-selected degree of the chosen haptic response, upon detection of the particular vehicle proximity condition.

12. A vehicle comprising a computing device in accordance with claim 9.

13. The computing device of claim 1 wherein the one or more processors are configured to execute instructions stored in the memory to enable a vehicle occupant to:
   choose, from among a menu of options, a haptic response to be provided by the ego-vehicle upon detection of a particular vehicle proximity condition; and
   operate the ego-vehicle to provide the chosen haptic response upon detection of the particular vehicle proximity condition.

14. The computing device of claim 13 wherein the one or more processors are configured to execute instructions stored in the memory to:
   enable a vehicle occupant to specify a degree of the chosen haptic response to be provided by the ego-vehicle upon detection of the particular vehicle proximity condition, so as to provide a user-selected degree of the chosen haptic response; and
   operate the ego-vehicle to provide the user-selected degree of the chosen haptic response, upon detection of the particular vehicle proximity condition.

* * * * *